United States Patent
Gintis et al.

(10) Patent No.: US 8,417,478 B2
(45) Date of Patent: Apr. 9, 2013

(54) NETWORK TEST CONFLICT CHECKING

(75) Inventors: Noah Gintis, Westlake Village, CA (US); Alok Srivastava, Woodland Hills, CA (US); Victor Alston, Oak Park, CA (US)

(73) Assignee: Ixia, Calabasas, CA (US)

( * ) Notice: Subject to any disclaimer, the term of this patent is extended or adjusted under 35 U.S.C. 154(b) by 324 days.

(21) Appl. No.: 12/889,271

(22) Filed: Sep. 23, 2010

(65) Prior Publication Data

US 2012/0078566 A1    Mar. 29, 2012

(51) Int. Cl.
G06F 3/01 (2006.01)
G06F 3/00 (2006.01)
G06F 3/02 (2006.01)
G06F 13/00 (2006.01)

(52) U.S. Cl. ......... 702/119; 702/118; 702/120; 702/123

(58) Field of Classification Search .......... 702/108, 702/117, 119, 120, 179, 182, 183, 186; 700/295; 709/223; 714/31

See application file for complete search history.

(56) References Cited

U.S. PATENT DOCUMENTS

| | | | |
|---|---|---|---|
| 5,764,155 A * | 6/1998 | Kertesz et al. | 700/295 |
| 5,850,386 A | 12/1998 | Anderson et al. | |
| 6,108,800 A | 8/2000 | Asawa | |
| 6,148,277 A | 11/2000 | Asava | |
| 6,279,124 B1 | 8/2001 | Brouwer | |
| 6,366,876 B1 | 4/2002 | Looney | |
| 6,549,943 B1 * | 4/2003 | Spring | 709/223 |
| 6,697,963 B1 * | 2/2004 | Nouri et al. | 714/31 |
| 7,099,438 B2 | 8/2006 | Rancu et al. | |
| 7,187,683 B1 | 3/2007 | Sandoval et al. | |
| 2003/0231741 A1 | 12/2003 | Rancu et al. | |
| 2004/0236866 A1 | 11/2004 | Dugatkin et al. | |
| 2006/0262729 A1 | 11/2006 | Chau et al. | |
| 2007/0025261 A1 | 2/2007 | Ginsberg et al. | |

* cited by examiner

*Primary Examiner* — Eliseo Ramos Feliciano
*Assistant Examiner* — Felix Suarez
(74) *Attorney, Agent, or Firm* — SoCal IP Law Group LLP; Mark A. Goldstein; Steven C. Sereboff

(57) ABSTRACT

There is disclosed a system and method for network test conflict checking. The method may be performed by a network testing system and may be implemented as software. The method may include receiving user selected test features and user selected hardware for a network test. When receiving user selected features, incompatible features are made unselectable by reference to a feature database. A compatibility check is performed by referring to a hardware database and a feature database. Suggestive corrective changes may be provided to a user or automatically made to the selected features and/or selected hardware. The network test is written to hardware when the compatibility test is successful.

11 Claims, 8 Drawing Sheets

| Statistics Set 610 | Settings | Description 620 |
|---|---|---|
| Latency | | One-way per packet delay measurement (one turn) reported as Ave, Min, and Max |
| Latency and Delay Variation (Jitter) | | One-way per packet delay measurement and delay variation measured from output port to input port |
| Inter-arrival time/rate | | Delta of Receive Time of two consecutive packets |
| Sequence Checking | | Per Flow Ordering, Loss or Duplication of Packets Measurements on Receive Port |
| CP/DP Convergence | | Control Plane and Data Plane integrated time stamping for calculating convergence measurements<br>◎ More... |
| PRBS | | Data checks using Pseudo-Random Bit Sequence<br>Note: Enabling this feature will determine IxNetwork to replace the Traffic Payload with a Pseudo-Random Bit Sequence |
| IPv4/TCP/UDP Checksum Errors | | Checksum validation statistics |
| Data Integrity | | Data integrity checks |
| Packet Loss Duration | | Estimates time without received packets, calculated by frames delta at the expected rx rate |

Selected Statistics 660

- Tx Frames
- Rx Expected Frames
- Rx Frames
- Frames Delta
- Loss %
- Tx Frame Rate
- Rx Frame Rate
- Rx Bytes
- Rx Rate (Bps) ⎫
- Rx Rate (bps)   ⎬ 663
- Rx Rate (Kbps) ⎪
- Rx Rate (Mbps) ⎭
- First TimeStamp
- Last TimeStamp © 2010 Ixia ID 8,417,478 B2 omitted.

NETWORK TEST CONFLICT CHECKING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network communications testing and checking for conflicts in user specified network tests.

2. Description of the Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may be used to evaluate how well a network device or network segment handles data communication, streaming media and voice communications. Specifically, a network testing system may allow a user to choose to simulate one or more entities defined by the Session Initiation Protocol (SIP), to simulate real-world VoIP traffic and/or to assess conformance with SIP standards.

DESCRIPTION OF THE DRAWINGS

FIG. 3 is a screen shot of a window displaying available sets of network test statistics.

FIG. 6 is a screen shot of a window displaying available sets of network test statistics augmented with selected statistics.

DETAILED DESCRIPTION

Apparatus

Figure 1:
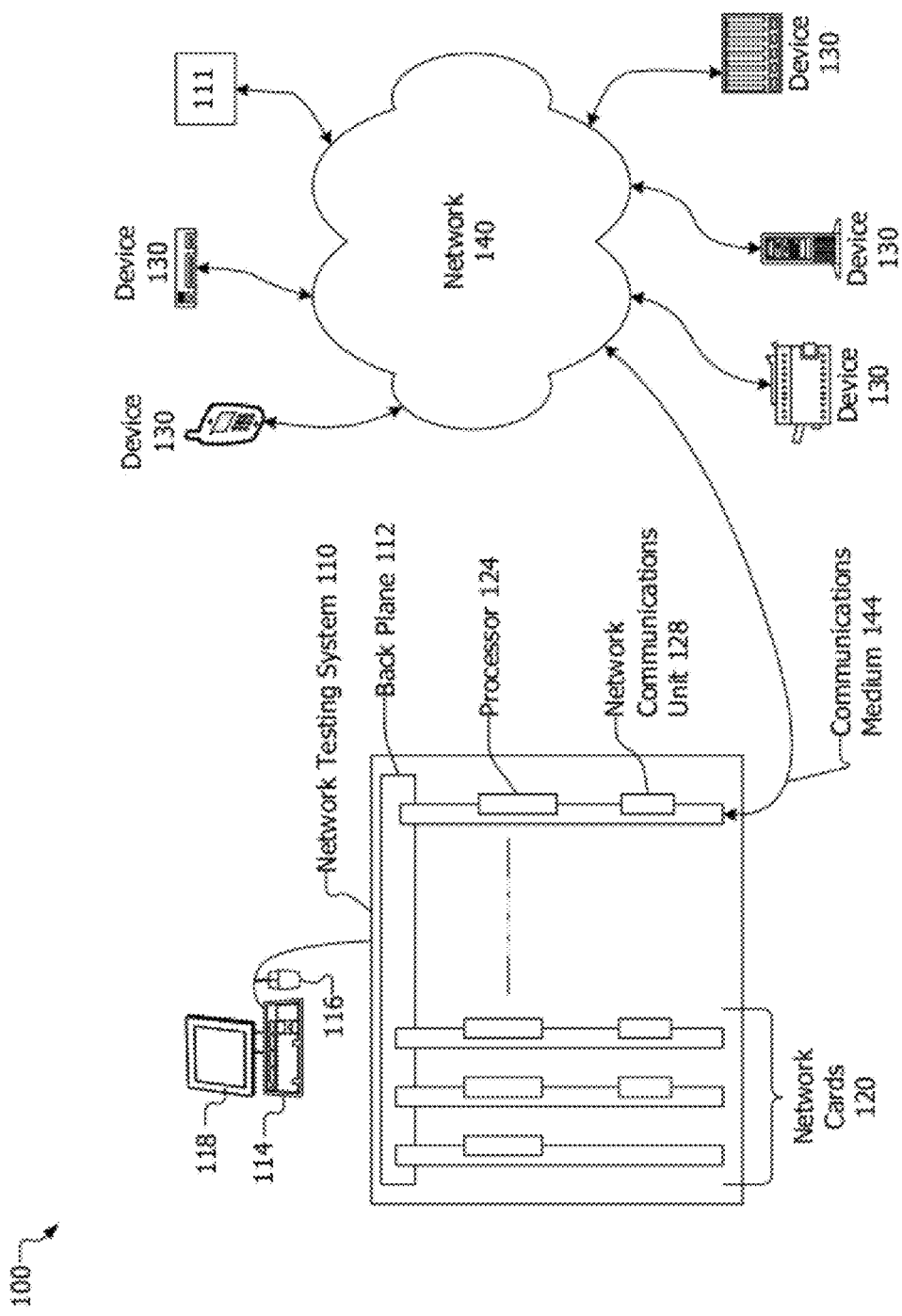
FIG. 1 is a block diagram of an environment in which conflict checking of network tests may be implemented.

FIG. 1 is a block diagram of an environment in which network testing including control and data plane convergence may be implemented. The environment 100 shows a network testing system 110 in which methods for receiving, processing and executing network tests may be implemented. The network test may be system default tests and may be user modified or user specified. The environment 100 includes network testing system 110 coupled via at least one network card 120 to a network 140 over a communications medium 144. The network testing system 110 may include or be one or more of a performance analyzer, a conformance validation system, a network analyzer, a packet blaster, a network management system, a combination of these, and/or others.

The network testing system 110 may be used to evaluate or measure characteristics and performance of a network communication medium, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software. The network testing system may be used to verify the functionality of network devices and/or conformance of SIP traffic with SIP standards or with vendor or specialized SIP implementations.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although a single connection over communications medium 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast-Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others. The network cards 120 may be referred to as blades, particularly when a processor is included on the network card.

The network cards 120 may include one or more processors 124 and one or more network communications units 128. In another embodiment, the network cards 120 may have no processors 124 and may include one or more network communications units 128. In the embodiment in which the network cards do not include a processor, processing may be performed by a processor on a motherboard of the network testing system 110, on another card, on the backplane or by a remote or external unit. When the network card 120 includes two or more network communications units 128, the network card 120 is in effect two or more network capable devices. That is, a network card 120 having n network communications units 128 may function as n network capable devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols. The network communications unit 128 may include a network interface through which the network card 120 may transmit and/or receive communications over the network 140.

The network card 120 may include and/or have access to local and/or remote memory, storage media and storage devices. Instructions to be executed by the processor 124 may be stored on and executed from a local or remote machine readable medium or storage device. A machine readable medium includes, for example, without limitation, magnetic media (e.g., hard disks, tape, floppy disks), optical media (e.g., CD, DVD, Blu-Ray disc), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, magnetic tape, solid-state drives (SSDs), DVD drives, Blu-Ray drives, flash memory devices, and others.

The processor 124, network communications unit 128, and memory may be included in one or more FPGAs, PLAs, PLDs on the network card 120. Additional and fewer units, hardware and firmware may be included in the network card 120.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network capable devices 130 in the network 140. The network testing system 110 may be used to test and evaluate the network 140 and/or portions thereof, network capable devices 130, applications running on network capable devices 130, and/or services provided by network 140 and/or network capable devices 130 and/or network applications. The network testing system 110, the network cards 120, and the network communications units 128 may all be network capable devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for data units to travel. Each node may be a network capable device as described below. A node may be a computing device, a data communications device, a network capable device, a network card, or other devices as defined and described herein.

Communications on the network 140 may take various forms, including frames, cells, datagrams, packets, messages, higher level logical groupings, or other units of information, all of which are referred to herein as data units. Those data units that are communicated over a network are referred to herein as network traffic. The network traffic may include data units that represent electronic mail messages, streaming media such as music (audio) and video, telephone (voice) conversations, web pages, graphics, documents, and others.

The network capable devices 130 may be devices capable of communicating over the network 140 and/or listening to, injecting, delaying, dropping, relaying, processing, and/or modifying network traffic on network 140. The network capable devices 130 may be computing devices such as computer workstations, personal computers, servers, portable computers, set-top boxes, video game systems, media players such as Blue-ray disc players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network capable devices 130 may include home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network capable devices 130 may be devices to be tested and may be referred to as devices or systems under test.

The network testing system 110 may send communications over the network 140 to a or through a network capable device 130. The destination of communications sent by the network testing system 110 may be a device under test such as a network capable device 130, may be the network testing system 110 such as a test between two network cards in the same network testing system 110, and may be a second network testing system 111. The network testing system 111 may be similar to or the same as network testing system 110. A first network card 120 in the network testing system 110 may send communications over the network 140 to a or through a network capable device 130 that are received by a second network card 120 in the network testing system 110 or are received by a third network card in the network testing system 111. A first network communications unit in a first network card in the first network testing system 110 may send communications over the network 140 to a second network testing system 111, and a second network communications unit the first network card in the first network testing system 110 may receive communications over the network 140 from the second network testing system 111. A first network communications unit in a first network card in the network testing system 110 may send communications over the network 140 and optionally through a network capable device 130 to a second network communications unit on the same network card in the same network testing system. The network testing system 110 may listen to and capture communications on the network 140.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a blade or other card with a processor in a network testing system. The network testing software may be stored on a volatile or nonvolatile memory device or storage medium included in or on and/or coupled with a computing device, a network testing system, a network card, or other card. The network testing software may include one or more databases that store feature information or hardware information. The network testing software may access one or more databases included on the network testing system that store feature information and/or hardware information. The databases may be implemented using relational techniques, may be two-dimensional tables, and may be stored in a compressed form. The feature information includes a listing of the various features that may be tested. The feature information database may be relatively large and list features such as a list of protocols for which conformance testing may be performance, round-trip statistics, one-way statistics, latency statistics, and many others. The hardware information includes a listing of the kinds of hardware that may be used in various network tests, such as ports, cards, routers, etc., both physical and virtual.

The methods may be implemented on one or more network cards 120 in a single network testing system or may be implemented on one or more network cards 120 on each of two or more network testing systems.

The network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols.

Methods

Figure 2:
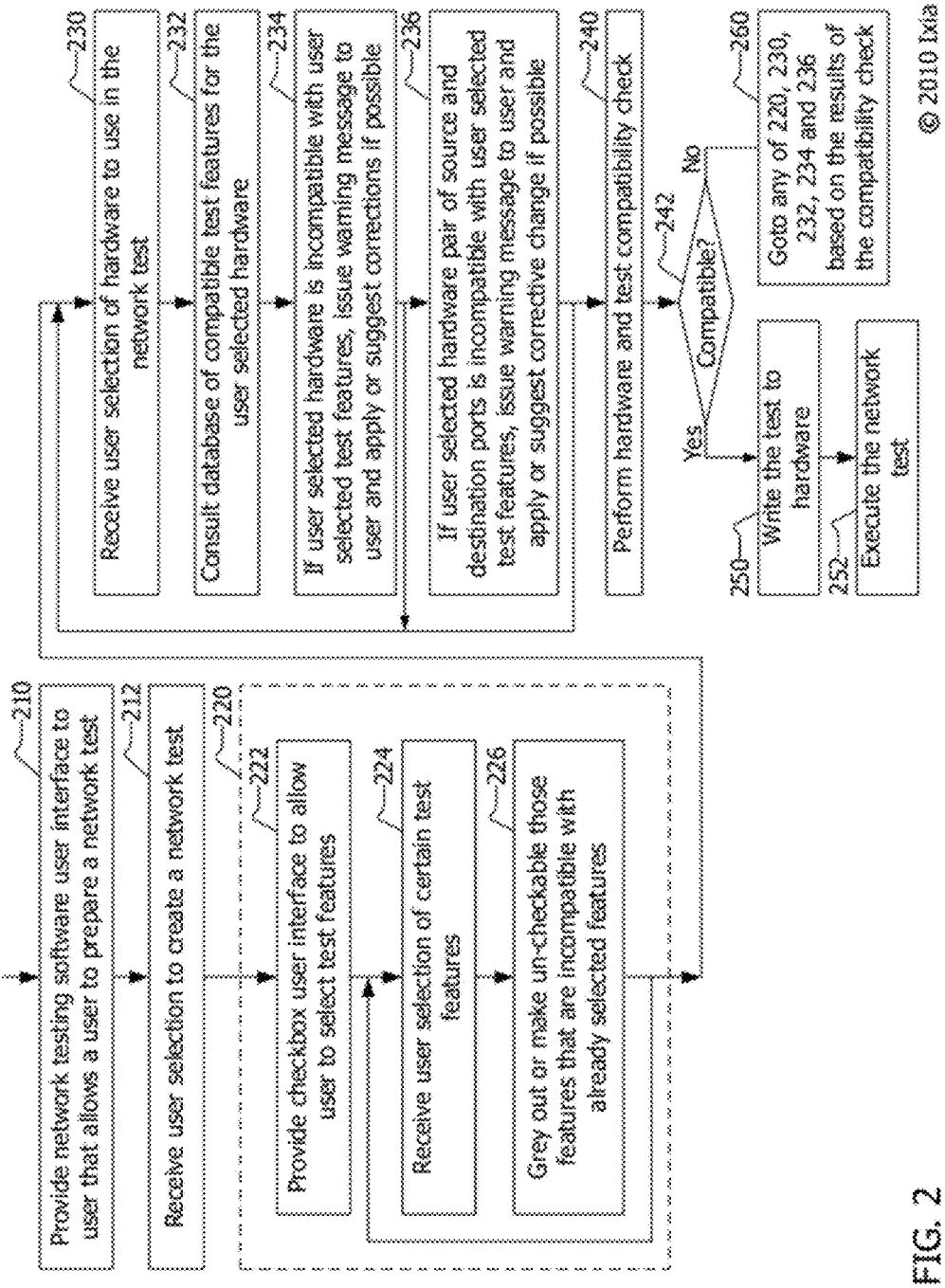
FIG. 2 is a flow chart of actions taken to implement network test conflict checking.
Figure 3:
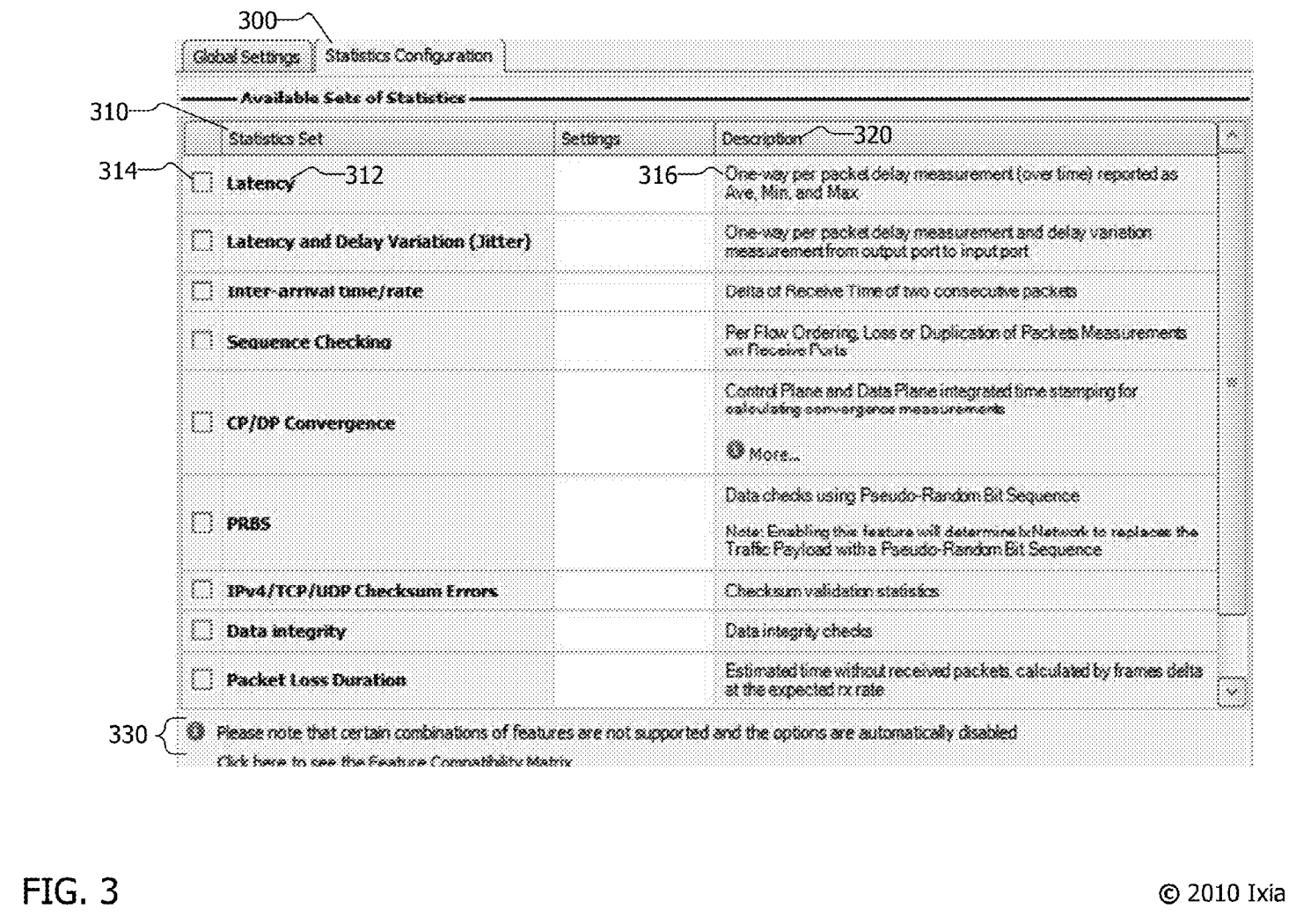

FIG. 2 is a flow chart of actions taken by network testing software to implement network test conflict checking. The network testing software provides a network testing software user interface that allows a user to prepare a network test, as shown in block 210. The network testing software receives a user selection to create a network test, as shown in block 212. The steps taken to obtain user selection of network tests according to desired statistics are shown in block 220. The network testing software provides a checkbox user interface to allow the user to select test features, as shown in block 222. Referring now to FIG. 3, there is shown a screen shot of a window displaying available sets of network test statistics referenced in block 222. A statistics configuration window 300 may show statistics sets 310 available in a system provided set of statistics. The window includes a user interface that allows a user to select from the various sets of statistics. The user interface may provide check boxes, radio buttons or other text and/or graphical constructs that allow a user to select from the various sets of statistics. Descriptions 320 of the available statistics sets may be provided. For example, an example statistic set is latency 312 and its associated description 316. Other statistic sets may include latency and delay variation, commonly referred to as jitter; sequence checking; control plane/data plane convergence; pseudo-random bit sequence (PRBS); checksum errors for various protocols including, but not limited to IPv4, TCP and UDP; data integrity; and packet loss duration.

Referring again to FIG. 2, the network testing software receives user selection of certain test features, as shown in block 224. That is, the network testing software recognizes a user's selecting a check box, clicking a radio button or otherwise providing input to the user interface. When the term selection or user selection is used herein, this refers to the network testing software receiving or recognizing a user action such as selecting a check box, clicking a radio button, tapping on an icon, mousing over or otherwise providing input to the network testing software through the network testing software's user interface. The network testing software grays out, makes unselectable or makes un-checkable those features that are incompatible with already selected features, as shown in block 226. A general notification of the unavailability of certain features based on the prior selection of other features may be provided in a text box or field 330 shown in FIG. 3, or via a pop up window, a notification area or using another user interface construct. The flow of actions may loop between blocks 224 and 226 as the user selects and unselects various features based on user selected statistics sets.

As a user selects one or more sets of network test statistics, the network testing system grays out or otherwise designates other statistics as unselectable or unavailable while other statistics that are compatible with the selected statistic set remain selectable and available and are not grayed out. To provide this functionality, the network testing software refers to feature information contained in a feature database. The feature database contains information about those features that are compatible with other features and/or those features that are incompatible with other features.

Figure 4:
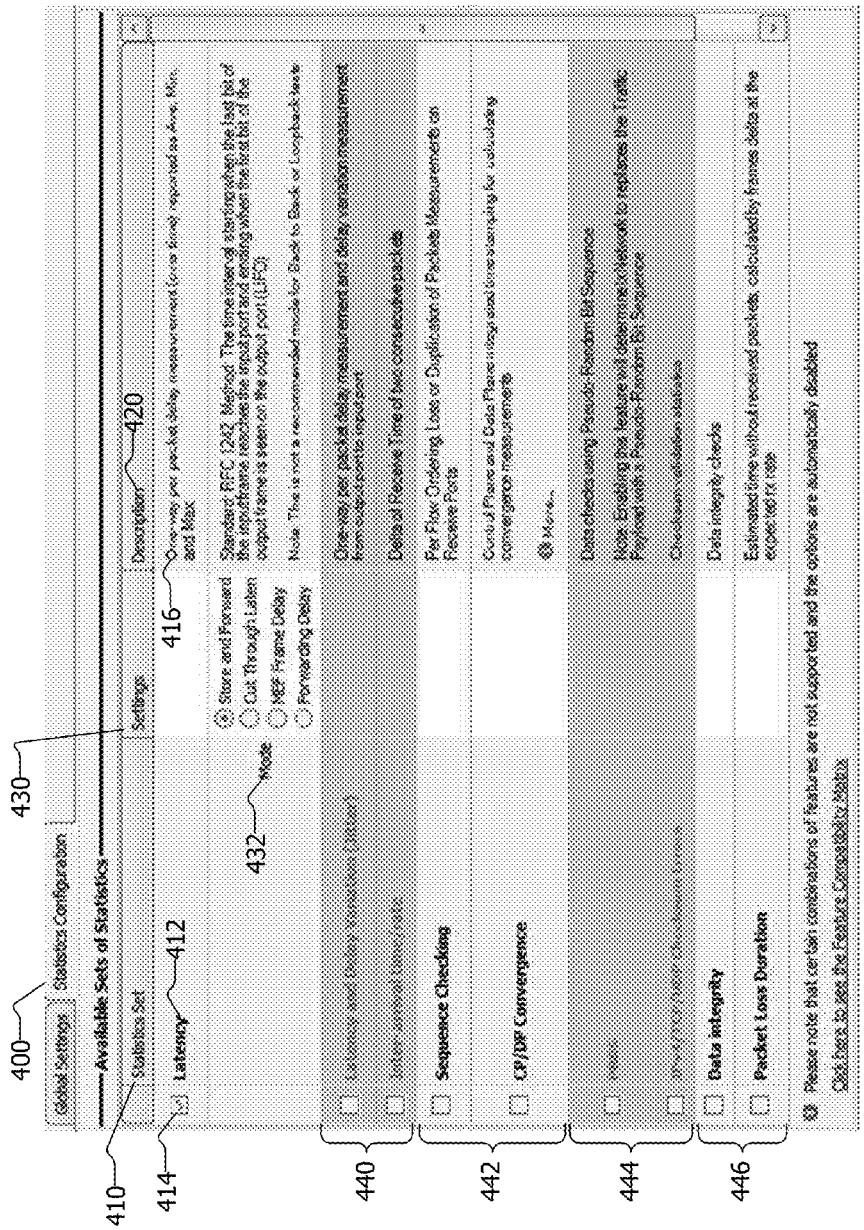
FIG. 4 is a screen shot of a first window displaying a selected set of network test statistics, available sets of network test statistics, and unavailable sets of network test statistics.

Referring to FIG. 4, a screen shot of a first window displaying a selected set of network test statistics, available sets of network test statistics, and unavailable sets of network test statistics is shown. In the example shown, as a user selects one or more sets of network test statistics, such as latency 412, the network testing system grays out or otherwise designates other statistics as unavailable, in this example, Latency and Delay Variation (Jitter) and Inter-arrival time/rate shown as 440, and PRBS and shown as IPv4/TCP/UDP Checksum Errors 444. Other statistics that are compatible with the selected statistic set remain available and are not grayed out or displayed in an altered fashion, in this example, Sequence Checking and CD/DP Convergence shown as 442, and Data Integrity and Packet Loss Duration shown as 446.

In addition, the network testing software may allow the user to provide additional information or added details for selected statistics which may be provided in a settings column 430. For example, for latency 412, certain settings 430 such as the type of mode 432 may be provided for the user to select. In this example, the network testing software provides the user the ability to select mode 432 from store and forward, cut through latency, MEF frame delay and forwarding delay. The network testing software may allow the user the ability to select from or specify many other settings 430.

Figure 5:
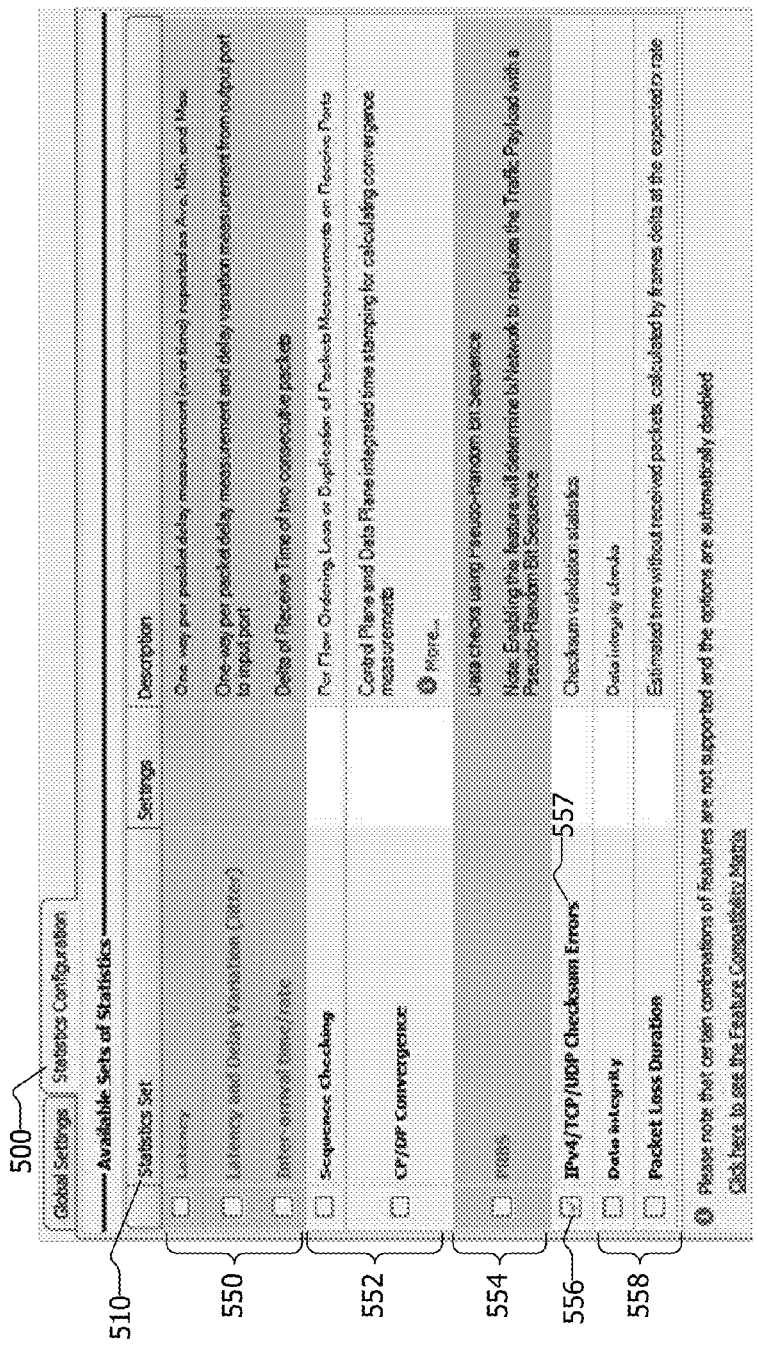
FIG. 5 is a screen shot of a second window displaying a selected set of network test statistics, available sets of network test statistics, and unavailable sets of network test statistics.

FIG. 5 is a screen shot of a second window displaying a selected set of network test statistics, available sets of network test statistics, and unavailable sets of network test statistics. As a user selects 556 one or more sets of network test statistics 510, in this example, IPv4/TCP/UDP Checksum Errors 557, the network testing system grays out or otherwise designates other sets of statistics as unavailable as shown by statistics Latency, Latency and Delay Variation (Jitter), and Inter-arrival time/rate shown as 510 and PRBS 554. Other statistics that are compatible with the selected statistic set remain available and are not grayed out or displayed in an altered fashion, in this example Sequence Checking, CD/DP Convergence shown as 552, and Data Integrity and Packet Loss Duration shown as 558.

FIG. 6 is a screen shot of a window displaying available sets of network test statistics augmented with selected statistics. The network testing software may provide a list of selected statistics based on the statistics set or sets 610 selected by a user. When a user mouses over a particular statistics set such as latency 612, selected statistics 660 may be provided. In this example, the selected statistics 660 are provide per flow 661. In addition, the network testing software may highlight or other make conspicuous for example by changing a font attribute such as bold, etc. those flows 663 included in the selected the statistics set or sets.

Figure 7:
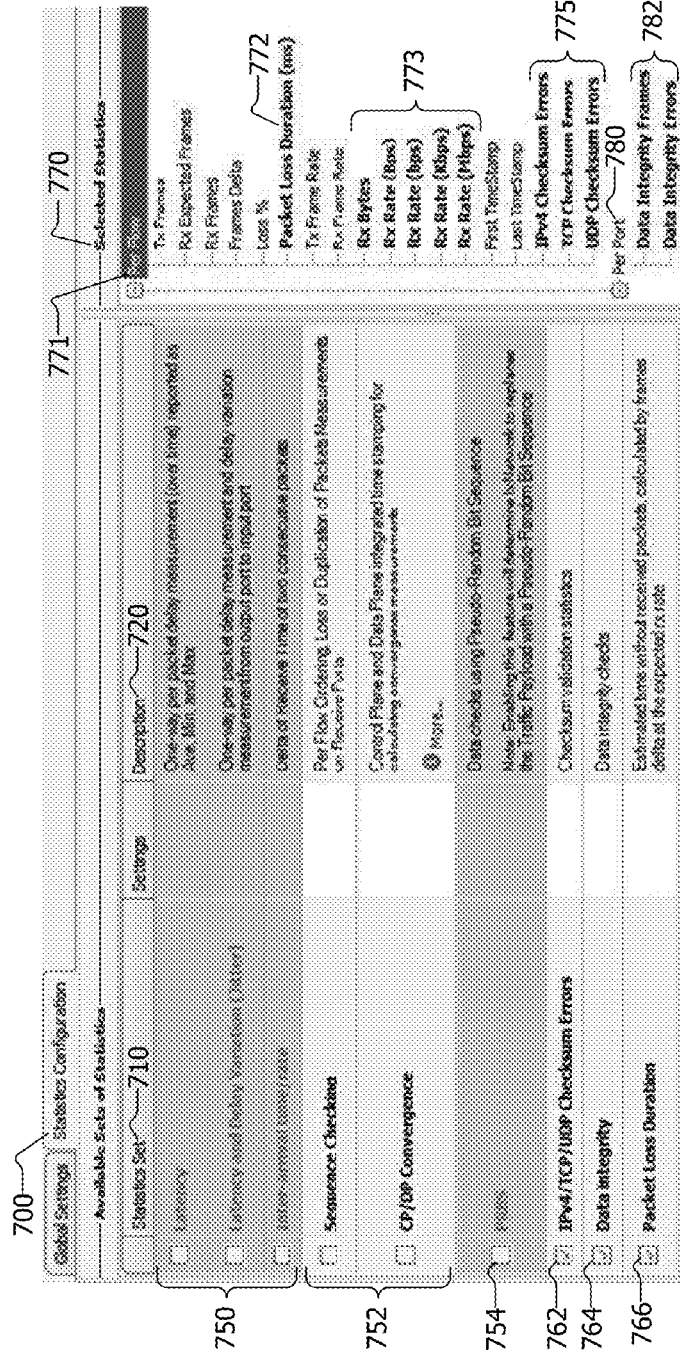
FIG. 7 is a screen shot of a window displaying selected sets of network test statistics, available sets of network test statistics, and unavailable sets of network test statistics augmented with selected statistics.

FIG. 7 is a screen shot of a window displaying selected sets of network test statistics, available sets of network test statistics, and unavailable sets of network test statistics augmented with selected statistics. This is similar to the drawing shown in FIG. 5, but with two additional statistics sets selected. Selected statistics sets from the available statistics sets are shown as IPv4/TCP/UDP Checksum Errors 762, Data Integrity 764 and Packet Loss Duration 766. Other compatible statistics sets that may be selected are Sequence Checking and CP/DP Convergence shown as 752. Incompatible or conflicting statistics sets are shown as grayed out and include Latency, Latency and Delay Variation (Jitter), and Inter-arrival time/rate shown as 750 and PRBS shown as 754. When sets of statistics are selected, the network testing system may provide a list of selected statistics 770. The selected statistics may be presented per flow 771 and per port 780. When packet loss duration 766 is selected, the network testing system may conspicuously display packet loss duration 772 in the list of selected statistics. When data integrity 764 is selected, the network testing software may conspicuously display data integrity frames and errors 782 per port 780 in the selected statistics 770 list. When IPv4/TCP/UDP Checksum Errors 762 is selected, the network testing software may conspicuously display IPv4 Checksum Errors, TCP Checksum Errors and UDP Checksum Errors 775 per flow 771 in the selected statistics 770 list.

After receiving test statistic configuration information as described and shown regarding block 220 of FIG. 2 and FIGS. 3-7, the network testing software receives user selection of hardware to use in the network test, as shown in block 230 of FIG. 2. To achieve this, the network testing software obtains information about available hardware from the network testing system. The network testing software may achieve this by making operating systems calls and by using other techniques. The network testing software provides a user interface that includes available hardware to the network testing software user. Available hardware includes hardware components available on local and/or remote network testing systems and cards included therein, such as, for example, Ethernet (various kinds), ATM, Fibre Channel, and others. The network testing software then recognizes user selection of hardware to use in the network test.

The network testing software then consults a database of compatible test features for the user selected hardware, as shown in block 232. The network testing software checks if user selected hardware is incompatible with user selected test features, as shown in block 234. If so, the network testing software may, in various embodiments or as appropriate, issue a warning message to the user, apply a suggested correction if possible, or suggest correction if possible, as shown in block 234. That is, when the selected hardware is incompatible with the selected test features, the network testing software may identify corrective changes to the selected hardware and/or the selected test features, notify the user of suggested corrective changes to the selected hardware and/or the selected test features, and, in some embodiments, automatically apply the corrective changes to the selected hardware and/or the selected test features. When incompatibilities are found between the user selected test features and the user selected hardware, the flow of actions may continue at block 230 to allow a user to re-select and/or de-select hardware to be used in the network test to remove any incompatibility issues.

During this process, network testing software suggested hardware and/or feature changes may be provided as automated correction to the user by text boxes, pop-up boxes, pre-filled in check boxes rendered conspicuous by a color, and by other techniques. The automated corrections may include packet size changes, header size changes, frame size changes, speed changes, memory used changes, number of streams changes, and others. Also, at this point the user may select to return to block 220 to amend or change the user selected test features. This may be achieved by the user selecting a network testing software provided icon, pull down menu item, or other user interface technique.

After the more general hardware check is made in block 234, the network testing software checks if the user selected source and destination ports (if specified) are incompatible with user selected test features, as shown in block 236. In one embodiment, a real hardware scan of ports may be conducted by the network testing software. In another embodiment, the network testing software uses stored port information or virtual port information to perform this check. The stored port information may be in the network testing software or may be in the hardware database. If there is an incompatibility, the network testing software may, in various embodiments or as appropriate, issue a warning message to the user, apply a corrective change if possible, or suggest a corrective change if possible, as shown in block 236. When incompatibilities are found between the user selected test features and the user selected source and/or destination ports, the flow of actions may continue at block 230 to allow a user to re-select and/or de-select ports to be used in the network test to remove any incompatibility issues. Incompatibilities found may include incompatible packet size, incompatible header size, incompatible frame size, incompatible speed (the port is not fast enough to handle the specified test), not enough memory, too many streams, and others. During this process, network testing software suggested port changes may be provided as automated correction to the user by text boxes, pop-up boxes, pre-filled in check boxes rendered conspicuous by a color, and by other techniques. Also, at this point the user may select to return to block 220 to amend or change the user selected test features. This may be achieved by the user selecting a network testing software provided icon, pull down menu item, or other user interface technique.

After block 236, the network testing software performs a hardware and test compatibility check, as shown in block 240. If the selected test configuration and selected hardware are compatible, as shown in block 242, the network testing software writes the test to the hardware, as shown in block 250. The network testing software then executes the network test, as shown in block 252.

If the selected test configuration and selected hardware are incompatible, as shown in block 242, based on the results of the compatibility check, the flow of actions continues at any of blocks 220, 230, 232, 234 and 236.

The benefit of the method described herein and shown in particular in FIG. 2 is that information is not written to hardware until the entirety of the test has been found to be likely executable and include compatible features and hardware. Writing test features and hardware configuration information to hardware uses hardware and software resources on the network testing system, included components and connected components. Running the compatibility checks described in this method makes testing more efficient in that problems are identified and resolved in software before the tests are sent to the hardware; it takes less time to identify and resolve problems and incompatibilities in software when compared to sending a testing to hardware and attempting to execute a problematic test that can result in failure. Running the compatibility checks described in this method eliminates or reduces the interruption of using the hardware included in the network testing system and coupled with the network testing system so that the network testing system and related components can be used more productively. Running the compatibility checks described in this method helps to ensure likely success of the user specified test and hardware selections. Running the compatibility checks described in this method minimizes the possibility of test problems or failures in the user specified test and hardware selections. Running the compatibility checks described in this method eliminates or reduces silent failures in the form of erroneous results calculated based on a selected feature or specified parameter that is not supported by the selected hardware. A silent failure does not cause a network test to be halted or the network hardware to crash or the network testing system to crash, but a silent failure causes erroneous results to be calculated and reported stemming from selected feature incompatibilities, selected features not being supported by selected hardware, or selected or specified parameters not being supported.

Figure 8:
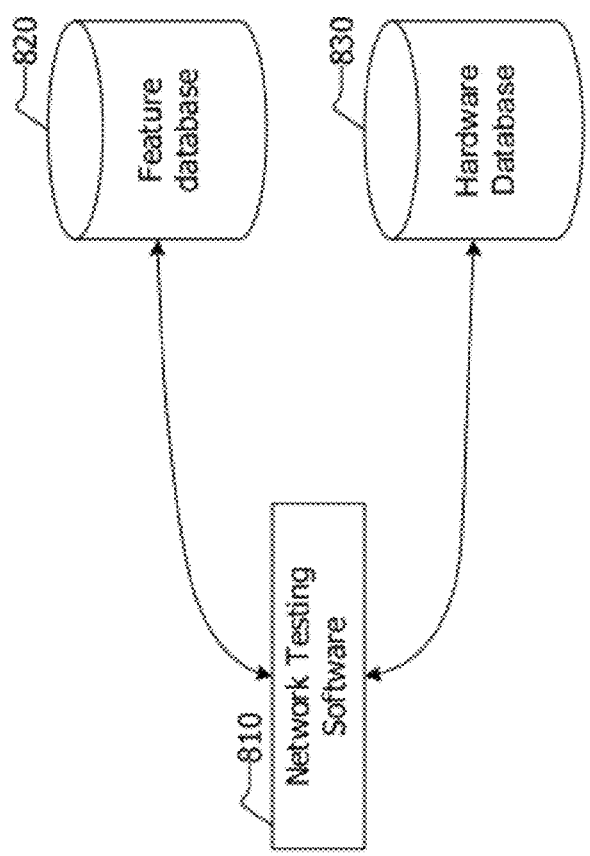
FIG. 8 is a block diagram showing feature and hardware databases accessed by network testing software.

FIG. 8 is a block diagram showing the feature and hardware databases accessed by network testing software. To perform the conflict checking described herein, the network testing software 810 accesses both a feature database 820 and a hardware database 830. The feature database 820 includes feature information that the various features that may be tested. The feature database 820 may be relatively large and include features such as protocols for which conformance testing may be performance, round-trip statistics, one-way statistics, latency statistics, and many others. The hardware database 830 includes hardware information such the kinds of hardware that may be used in various network tests, such as ports, cards, routers, etc., both physical and virtual, and their characteristics, such as, for example, speed, throughput, etc. Although shown as two separate databases, the feature database and hardware database may be included in a single database.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A network testing system having at least network card, the network card including a processor, a memory and a network communications unit, the network testing system coupled with a network, the network testing system having instructions stored thereon which when executed cause the network testing system to perform operations comprising:
   receiving user selection to create a network test;
   providing a user interface to allow the user to select test features for the network test;
   receiving selection of selected test features from the user to include in the network test;
   referring to a feature database to identify features that are incompatible with the selected test features;
   updating the user interface to make identified incompatible features unselectable;
   receiving selection of selected hardware from the user to use in the network test;
   referring to a hardware database to evaluate whether the selected hardware is compatible with the selected test features, including identifying whether there is a silent failure condition;
   when the selected hardware is incompatible with the selected test features, performing one or more of
      issuing a warning message to the user,
      identifying corrective changes to the selected hardware and/or the selected test features,
      notifying the user of suggested corrective changes to the selected hardware and/or the selected test features,
      automatically applying the corrective changes to the selected hardware and/or the selected test features.

2. The network testing system of claim 1 having further instructions stored thereon which when executed cause the network testing system to perform further operations comprising:
   receiving user selection to execute the network test;
   writing the user specified network test to hardware;
   executing the network test.

3. The network testing system of claim 1 wherein the receiving selection of selected hardware comprises:
   receiving user selection of at least one source port and/or at least one destination port.

4. The network testing system of claim 1 wherein the corrective changes are selected from the group including packet size changes, header size changes, frame size changes, speed changes, memory used changes, and number of streams changes.

5. The network testing system of claim 1 wherein writing the user specified network test to hardware is performed after confirming that the selected test features and the selected hardware are compatible.

6. The network testing system of claim 1 wherein the hardware database and the feature database are included in the network testing system.

7. A method for network testing comprising:
   receiving in a network testing system user selection to create a network test;
   providing a user interface to allow the user to select test features for the network test;
   receiving selection of selected test features from the user to include in the network test;
   referring to a feature database to identify features that are incompatible with the selected test features;
   updating the user interface to make identified incompatible features unselectable;
   receiving selection of selected hardware from the user to use in the network test;
   referring to a hardware database to evaluate whether the selected hardware is compatible with the selected test features, including identifying whether there is a silent failure condition;
   when the selected hardware is incompatible with the selected test features, performing one or more of
      issuing a warning message to the user,
      identifying corrective changes to the selected hardware and/or the selected test features,
      notifying the user of suggested corrective changes to the selected hardware and/or the selected test features,
      automatically applying the corrective changes to the selected hardware and/or the selected test features.

8. The method of claim 7 having further instructions stored thereon which when executed cause the network testing system to perform further operations comprising:
   receiving user selection to execute the network test;
   writing the user specified network test to hardware;
   executing the network test.

9. The method of claim 7 wherein the receiving selection of selected hardware comprises:
   receiving user selection of at least one source port and/or at least one destination port.

10. The method of claim 7 wherein the corrective changes are selected from the group including packet size changes, header size changes, frame size changes, speed changes, memory used changes, and number of streams changes.

11. The method of claim 7 wherein writing the user specified network test to hardware is performed after confirming that the selected test features and the selected hardware are compatible.

* * * * *